United States Patent
Sato (10) Patent No.: US 10,071,745 B2
(45) Date of Patent: Sep. 11, 2018

(54) AUTOMATED DRIVE ASSISTING SYSTEM, AUTOMATED DRIVE ASSISTING METHOD, AND COMPUTER PROGRAM

(71) Applicant: AISIN AW CO., LTD., Anjo-shi, Aichi-ken (JP)

(72) Inventor: Yuji Sato, Owariasahi (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/324,534

(22) PCT Filed: Jul. 30, 2015

(86) PCT No.: PCT/JP2015/071592
§ 371 (c)(1),
(2) Date: Jan. 6, 2017

(87) PCT Pub. No.: WO2016/035486
PCT Pub. Date: Mar. 10, 2016

(65) Prior Publication Data
US 2017/0197634 A1  Jul. 13, 2017

(30) Foreign Application Priority Data
Sep. 2, 2014 (JP) ................................ 2014-177870

(51) Int. Cl.
*B60W 50/08* (2012.01)
*B60W 30/14* (2006.01)
(Continued)

(52) U.S. Cl.
CPC .......... *B60W 50/082* (2013.01); *B60W 10/04* (2013.01); *B60W 10/18* (2013.01);
(Continued)

(58) Field of Classification Search
CPC ..... B60W 50/082; B60W 10/04; B60W 10/18
See application file for complete search history.

(56) References Cited

U.S. PATENT DOCUMENTS 5,774,069 A      6/1998  Tanaka et al.
7,783,426 B2 *   8/2010  Kato .................... B60W 40/04
                                              180/167
(Continued)

FOREIGN PATENT DOCUMENTS

JP    H09161196 A      6/1997
JP    2008-290680 A   12/2008
(Continued)

OTHER PUBLICATIONS

Oct. 20, 2015 International Search Report issued in Patent Application No. PCT/JP2015/071592.

*Primary Examiner* — Adam D Tissot
*Assistant Examiner* — Alex C Dunn
(74) *Attorney, Agent, or Firm* — Oliff PLC (57) ABSTRACT

Automated drive assisting systems, methods, and programs acquire an expected travel route for a vehicle that includes an automated drive section in which automated drive control for the vehicle is permitted, and execute the automated drive control for the vehicle such that the vehicle travels along the expected travel route in the automated drive section which is included in the expected travel route. The systems, methods, and programs recover the automated drive control after the vehicle, which travels through manual drive based on a drive operation by a user, passes through a branch point that is provided in the automated drive section and that meets a predetermined condition.

12 Claims, 7 Drawing Sheets

(51) Int. Cl.
*G01C 21/26* (2006.01)
*B60W 10/04* (2006.01)
*B60W 10/18* (2012.01)
*B60W 10/20* (2006.01)
*B60W 30/10* (2006.01)
*G05D 1/00* (2006.01)
*G05D 1/02* (2006.01)
*G01C 21/34* (2006.01)
*G08G 1/0967* (2006.01)

(52) U.S. Cl.
CPC ............ *B60W 10/20* (2013.01); *B60W 30/10* (2013.01); *B60W 30/14* (2013.01); *G01C 21/26* (2013.01); *G01C 21/3407* (2013.01); *G05D 1/0061* (2013.01); *G05D 1/0212* (2013.01); *G05D 1/0276* (2013.01); *B60W 2510/18* (2013.01); *B60W 2510/20* (2013.01); *B60W 2520/06* (2013.01); *B60W 2710/06* (2013.01); *B60W 2710/18* (2013.01); *B60W 2710/20* (2013.01); *G05D 2201/0213* (2013.01); *G08G 1/096775* (2013.01); *G08G 1/096783* (2013.01); *G08G 1/096791* (2013.01); *H05K 999/99* (2013.01)

(56) References Cited

U.S. PATENT DOCUMENTS

| | | | |
|---|---|---|---|
| 9,008,887 B2* | 4/2015 | Kindo | G05D 1/0061 701/23 |
| 9,141,109 B1* | 9/2015 | Kamata | G05D 1/0061 |
| 9,836,051 B2* | 12/2017 | Ishikawa | B60W 50/08 |
| 9,840,257 B2* | 12/2017 | Ebina | B60K 28/06 |
| 2006/0235615 A1* | 10/2006 | Kato | B60W 40/04 701/300 |
| 2014/0018993 A1* | 1/2014 | Kindo | B60W 30/143 701/23 |
| 2015/0025731 A1* | 1/2015 | Uehara | G05D 1/00 701/23 |
| 2015/0197246 A1* | 7/2015 | Nagasaka | B60W 30/10 701/1 |
| 2015/0329111 A1* | 11/2015 | Prokhorov | B60W 10/18 701/41 |
| 2016/0229410 A1* | 8/2016 | Clarke | B60W 30/00 |
| 2017/0018189 A1* | 1/2017 | Ishikawa | G05D 1/0214 |
| 2017/0203770 A1* | 7/2017 | Kondo | B60W 50/14 |

FOREIGN PATENT DOCUMENTS

| | | |
|---|---|---|
| JP | 2011/162132 A | 8/2011 |
| JP | 2012-051441 A | 3/2012 |

* cited by examiner

AUTOMATED DRIVE ASSISTING SYSTEM, AUTOMATED DRIVE ASSISTING METHOD, AND COMPUTER PROGRAM

TECHNICAL FIELD

Related technical fields include automated drive assisting systems, methods, and programs that assist a vehicle to travel through automated drive control.

BACKGROUND

In recent years, many vehicles are provided with a navigation apparatus that provides travel guidance for the vehicle to allow a driver to easily reach a desired destination location. The navigation apparatus is a device that can detect the current position of the vehicle using a GPS receiver or the like and acquire map data corresponding to the current position from a storage medium such as a DVD-ROM or an HDD or through a network to display the map data on a liquid crystal monitor. Furthermore, such a navigation apparatus is provided with a route search function for searching for a recommended route from the vehicle position to a desired destination location when the destination location is input, and adapted to set the recommended route found in the search as a route for guidance, display the route for guidance on a display screen, and provide audio guidance in the case where the vehicle approaches an intersection or the like in order to reliably guide a user to the desired destination location. In recent years, in addition, some cellular phones, smartphones, tablet terminals, personal computers, and so forth also have functions that are similar to those of the navigation apparatus described above.

In recent years, in addition, there has been proposed, as a travel mode of a vehicle, travel through automated drive control in which the vehicle travels automatically along a route set in advance with no reliance on a drive operation by a user, besides manual travel in which the vehicle travels on the basis of a drive operation by the user. In the automated drive control, for example, the current position of the vehicle, the lane in which the vehicle travels, and the positions of other vehicles around the vehicle are detected at all times, and vehicle control for a steering unit, a drive source, a brake unit, and so forth is performed automatically such that the vehicle travels along the route set in advance. Although travel through the automated drive control is advantageous in that a burden related to drive on the user can be reduced, travel through the automated drive control may be difficult in some situations, depending on the road conditions and the surrounding environment. Examples of such situations include a situation where a right or left turn is to be made at an intersection, a situation where it is necessary to make a lane change or a lane merge in a short section, and a situation in a bad weather. In such situations, it is necessary to suspend travel through the automated drive control and commence manual drive.

In the case where travel through the automated drive control is to be suspended, it is necessary for the user to travel through the manual drive after travel through the automated drive control is suspended, and thus it is desired to appropriately make a changeover from the automated drive control to the manual drive. Thus, Japanese Patent Application Publication No. 9-161196 (JP 9-161196 A), for example, proposes a technique of providing guidance on a changeover from automated drive control to manual drive in consideration of the time required for the changeover in the case where a vehicle is traveling through the automated drive control on a highway on which travel through the automated drive control is permitted and the vehicle has approached an end point (IC) of the highway where it is necessary to make a changeover to the manual drive.

SUMMARY

In the technique according to JP 9-161196 A, the highway is defined as a section in which travel through the automated drive control is permitted, and thus a changeover from the automated drive control to the manual drive is basically made only at the end point of the highway. It is generally inconceivable to enter the highway immediately after exiting the highway, and thus there is also no need to recover the automated drive control immediately after a changeover to the manual drive is made. If general roads are included in the section in which travel through the automated drive control is permitted, however, the vehicle passes through a large number of branch points on an expected travel route. Vehicles, pedestrians, bicycles, and so forth enter and exit from the branch points in different directions, often with irregular motion, and it is basically difficult for the vehicle to travel through the branch points through the automated drive control. Thus, if the general roads are included in the section in which travel through the automated drive control is permitted, it is necessary to make a changeover from the automated drive control to the manual drive before the vehicle passes through the branch points. It is also necessary to recover the automated drive control at as early a timing as possible after the vehicle passes through the branch points.

Exemplary embodiments of the broad inventive principles described herein provide an automated drive assisting system, an automated drive assisting method, and a computer program that enable a vehicle that has passed through a branch point through travel based on manual drive to appropriately recover automated drive control.

Exemplary embodiments provide automated drive assisting systems, methods, and programs that assist automated drive control for a vehicle when the vehicle travels through the automated drive control in an automated drive section in which the automated drive control for the vehicle is permitted. Specifically, exemplary embodiments provide systems, methods, and programs that acquire an expected travel route for a vehicle that includes an automated drive section in which automated drive control for the vehicle is permitted, and execute the automated drive control for the vehicle such that the vehicle travels along the expected travel route in the automated drive section which is included in the expected travel route. The systems, methods, and programs recover the automated drive control after the vehicle, which travels through manual drive based on a drive operation by a user, passes through a branch point that is provided in the automated drive section and that meets a predetermined condition.

With the automated drive assisting system, the automated drive assisting method, and the computer program configured as described above, it is possible to enable a vehicle that has passed through a branch point through travel based on manual drive to appropriately recover automated drive control. Thus, even in the case where general roads are included in a section in which travel through the automated drive control is permitted, it is possible for the vehicle to travel while switching between travel through the automated drive control and travel through the manual drive at appropriate timings in accordance with the situations.

DETAILED DESCRIPTION OF EXEMPLARY EMBODIMENTS

Figure 1:
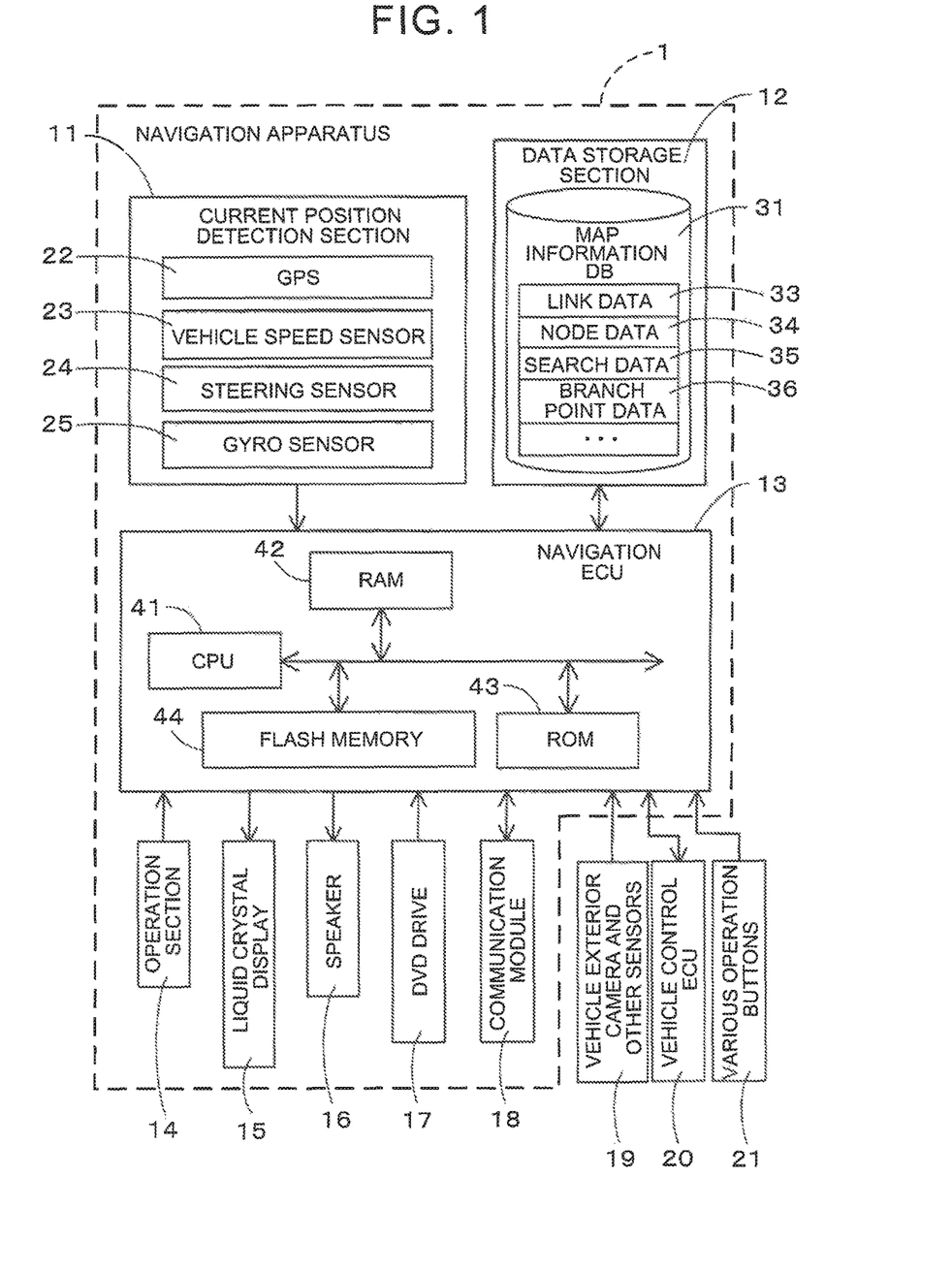
FIG. 1 is a block diagram illustrating the configuration of a navigation apparatus according to an embodiment.

An automated drive assisting system, embodied as a navigation apparatus, according to an embodiment will be described in detail below with reference to the drawings. First, a schematic configuration of a navigation apparatus 1 according to the embodiment will be described with reference to FIG. 1. FIG. 1 is a block diagram illustrating the navigation apparatus 1 according to the embodiment.

As illustrated in FIG. 1, the navigation apparatus 1 according to the embodiment has: a current position detection section 11 that detects the current position of the vehicle on which the navigation apparatus 1 is mounted; a data storage section 12 that stores various types of data; a navigation ECU 13 that performs various types of computation processing on the basis of input information; an operation section 14 that receives an operation from a user; a liquid crystal display 15 that displays, to the user, a map of an area around the vehicle, information on a route for guidance (an expected travel route for the vehicle) set in the navigation apparatus 1, and so forth; a speaker 16 that outputs audio route guidance; a DVD drive 17 that reads a DVD that serves as a storage medium; and a communication module 18 that communicates with an information center such as a probe center and a VICS (registered trademark: Vehicle Information and Communication System) center. In addition, the navigation apparatus 1 is connected to a vehicle exterior camera 19 and various sensors installed on the vehicle on which the navigation apparatus 1 is mounted via an in-vehicle network such as a CAN. Furthermore, the navigation apparatus 1 is connected to a vehicle control ECU 20 that performs various types of control for the vehicle on which the navigation apparatus 1 is mounted in a mutually communicable manner. The navigation apparatus 1 is also connected to various operation buttons 21 mounted on the vehicle such as an automated drive start button.

The constituent elements of the navigation apparatus 1 will be described below in order.

The current position detection section 11 is composed of a GPS 22, a vehicle speed sensor 23, a steering sensor 24, a gyro sensor 25, and so forth, and can detect the current position of the vehicle, the orientation, the travel speed of the vehicle, the current time, and so forth. In particular, the vehicle speed sensor 23 is a sensor that detects the travel distance of the vehicle and the vehicle speed, and generates pulses in accordance with rotation of drive wheels of the vehicle to output a pulse signal to the navigation ECU 13. The navigation ECU 13 counts the generated pulses to calculate the rotational speed of the drive wheels and the travel distance. It is not necessary that the navigation apparatus 1 should include all of the four sensors, and the navigation apparatus 1 may be configured to include only one or a plurality of such sensors.

The data storage section 12 includes: a hard disk (not illustrated) that serves as an external storage device and a storage medium; and a recording head (not illustrated) that serves as a driver that reads a map information DB 31, a predetermined program, and so forth stored in the hard disk and writes predetermined data into the hard disk. (As used herein, the term "storage medium" is not intended to encompass transitory signals.) The data storage section 12 may be constituted of a flash memory, a memory card, or an optical disk such as a CD or a DVD in place of the hard disk. The map information DB 31 may be stored in an external server to be acquired by the navigation apparatus 1 through communication.

The map information DB 31 is storage means for storing link data 33 on roads (links), node data 34 on node points, search data 35 for use in processing for searching for a route and changing the route, branch point data 36 on branch points, facility data on facilities, map display data for displaying a map, retrieval data for retrieving a location, and so forth, for example.

The stored link data 33 include: for links composing a road, data representing the width of the road to which the link belongs, gradient, cant, bank, road surface state, merging section, road structure, number of lanes of the road, location at which the number of lanes is reduced, location at which the width is reduced, a railroad crossing, and so forth; for corners, data representing the radius of curvature, an intersection, a T junction, an entrance to and an exit from the corner, and so forth; for road attributes, data representing a descending road, an ascending road, and so forth; and for road types, data representing a general road such as a national road, a prefectural road, and a narrow street, and a toll road such as a national express highway, an urban expressway, a road exclusively for automobiles, an ordinary toll road, and a toll bridge.

The stored node data 34 include: the coordinate (position) of a branch point (including an intersection, a T junction, etc.) of actual roads and a node point set every predetermined distance in accordance with the radius of curvature etc. on the roads; the node attribute representing whether the node is a node corresponding to an intersection or the like; a connected link number list which is a list of the link numbers of links connected to the node; an adjacent node number list which is a list of the node numbers of nodes that are adjacent to the node via a link; and data on the height (altitude) of each node point.

The stored search data 35 include various types of data for use in route search processing for searching for a route from a departure location (e.g. the current position of the vehicle) to a set destination location. Specifically, the stored search data 35 include cost calculation data used to calculate a search cost such as a cost (hereinafter referred to as an "intersection cost") obtained by quantifying the degree of suitability of an intersection for a route and a cost (hereinafter referred to as a "link cost") obtained by quantifying the degree of suitability of a link composing a road for a route.

The stored branch point data 36 include various types of data on the branch points. Specifically, the stored branch point data 36 include the positional coordinate of the branch point, the type of roads connected to the branch point, the number of lanes in the roads, the travel direction designation of each lane, the position of a stop line, and the presence or absence of a traffic signal.

The navigation ECU (electronic control unit) 13 is an electronic control unit that controls the entire navigation apparatus 1, and includes a CPU 41 that serves as a computation device and a control device, and internal storage devices such as a RAM 42 that is used as a working memory when the CPU 41 performs various types of computation processing and that stores route data etc. when a route is found, a ROM 43 that stores a control program, a travel assist processing program (see FIGS. 2 and 3) to be discussed later, and so forth, and a flash memory 44 that stores a program read from the ROM 43. The navigation ECU 13 has various means as processing algorithms. For example, route acquisition means acquires an expected travel route for the vehicle that includes an automated drive section in which automated drive control for the vehicle is permitted. Control execution means executes the automated drive control for the vehicle such that the vehicle travels along the expected travel route in the automated drive section which is included in the expected travel route. Travel assisting means makes a changeover from the automated drive control to manual drive based on a drive operation by the user in the case where there is a branch point that meets a predetermined condition ahead in the travel direction of the vehicle which travels through the automated drive control in the automated drive section.

The operation section 14 is operated to input a departure location at which travel is started and a destination location at which travel is ended, and has a plurality of operation switches (not illustrated) such as various keys and buttons. The navigation ECU 13 performs control so as to execute various corresponding operation on the basis of a switch signal output in response to a depression of a switch or the like. The operation section 14 may be composed of a touch panel provided on the front surface of the liquid crystal display 15. The operation section 14 may be composed of a microphone and a speech recognition device.

The liquid crystal display 15 displays a map image that includes roads, traffic information, operational guidance, an operation menu, key guidance, guidance information on a travel along a route for guidance (expected travel route), news, weather forecasts, the time, mails, television programs, and so forth. In the embodiment, the liquid crystal display 15 also outputs guidance that prompts the user to make a changeover from the automated drive control to the manual drive in the case where it is determined that the automated drive control cannot be executed because a right or left turn is to be made at a branch point, for example. The liquid crystal display 15 also outputs guidance indicating that the automated drive control is recovered in the case where it is determined that the automated drive control can be executed again after switching is made from the automated drive control to the manual drive. An HUD or an HMD may be used in place of the liquid crystal display 15.

Examples of the travel mode of the vehicle include travel through the automated drive control in which the vehicle travels automatically along a route set in advance with no reliance on a drive operation by the user, besides manual drive travel in which the vehicle travels on the basis of a drive operation by the user. In the automated drive control, for example, the current position of the vehicle, the lane in which the vehicle travels, and the positions of other vehicles around the vehicle are detected at all times, and vehicle control for a steering unit, a drive source, a brake unit, and so forth is performed automatically such that the vehicle travels along a route set in advance by the vehicle control ECU 20. Some types of the automated drive control have a function of making a lane change, and the others do not have the function of making a lane change (i.e. a lane change can be made only through the manual drive). The details of the automated drive control are already known in the art, and thus are not described herein. The automated drive control may be performed for all road sections, or may be performed only while the vehicle travels in a specific road section (e.g. on a highway provided with a gate at the boundary (whether attended or unattended, charged or free)). In the following description, the automated drive section in which the vehicle is subjected to the automated drive control is defined as all road sections that include general roads and highways, and the automated drive control is basically performed while the vehicle travels on the roads. It should be noted, however, that the automated drive control is not always performed in the case where the vehicle travels in the automated drive section, but is performed only in situations where the user selects performing the automated drive control and it is determined that the vehicle can travel through the automated drive control. That is, the automated drive section is a section in which the automated drive control is permitted for the vehicle in addition to the manual drive.

Although travel through the automated drive control is advantageous in that a burden related to drive on the user can be reduced, travel through the automated drive control may be difficult in some situations, depending on the road conditions and the surrounding environment. Examples of such situations include a case where the vehicle travels in a section in which a lane change or a lane merge is required within a predetermined distance, a case where the vehicle travels in a section in which a partition line has disappeared or faded to such a degree that the partition line cannot be recognized using a camera, and a case where a right or left turn is to be made at a branch point. Thus, in the navigation apparatus 1 according to the embodiment, it is determined whether or not the automated drive control can be executed in consideration of information acquired from the vehicle exterior camera 19 or an external server in the case where the vehicle travels in the automated drive section, and switching from the automated drive control to the manual drive is made automatically, or guidance that prompts the user to make a changeover from the automated drive control to the manual drive is provided, in the case where it is determined that the automated drive control cannot be executed. In the case where it is determined that the automated drive control can be executed again after switching is made from the automated drive control to the manual drive, further, switching from the manual drive to the automated drive control is made automatically, or guidance that prompts the user to make a changeover from the manual drive to the automated drive control is provided.

The speaker 16 outputs audio guidance on travel along a route for guidance and guidance on traffic information on the basis of an instruction from the navigation ECU 13. In the embodiment, the speaker 16 also outputs audio that prompts the user to make a changeover from the automated drive control to the manual drive in the case where it is determined that the automated drive control cannot be executed because a right or left turn is to be made at a branch point, for example. The speaker 16 also outputs audio guidance indicating that the automated drive control is recovered in the case where it is determined that the automated drive control can be executed again after switching is made from the automated drive control to the manual drive.

The DVD drive 17 is a drive that can read data stored in a storage medium such as a DVD and a CD. Music and video is reproduced, the map information DB 31 is updated, etc. on the basis of the read data. A card slot for reading and writing of a memory card may be provided in place of the DVD drive 17.

The communication module 18 is a communication device that receives traffic information, probe information, weather information, etc. transmitted from a traffic information center such as the VICS center or a probe center, for example, and may be a cellular phone or a DCM, for example. The communication module 18 may also include a vehicle-to-vehicle communication device that performs vehicle-to-vehicle communication and a road-to-vehicle communication device that performs communication with a roadside unit.

The vehicle exterior camera 19 is an imaging device constituted of a camera that uses a solid-state imaging element such as a CCD, for example, and is attached to the back side of a rearview mirror of the vehicle and installed with its optical axis directed forward in the travel direction of the vehicle. The vehicle exterior camera 19 captures a scene ahead in the travel direction of the vehicle in the case where the vehicle travels in the automated drive section. In addition, the vehicle control ECU 20 performs image processing on the captured image to detect a partition line drawn on the road on which the vehicle travels, other vehicles around the vehicle, and so forth, and performs the automated drive control for the vehicle on the basis of the detection results. The vehicle exterior camera 19 may be disposed on the rear side or at a side, rather than on the front side, of the vehicle. A sensor such as a millimeter wave radar, vehicle-to-vehicle communication, or road-to-vehicle communication may be used, in place of the camera, as means for detecting other vehicles.

The vehicle control ECU 20 is an electronic control unit that controls the vehicle on which the navigation apparatus 1 is mounted. In addition, the vehicle control ECU 20 is connected to various drive sections of the vehicle such as a steering unit, a brake unit, and an accelerator. In the embodiment, the vehicle control ECU 20 executes the automated drive control for the vehicle by controlling the drive sections particularly in the case where the vehicle travels in the automated drive section. In addition, the navigation ECU 13 transmits an instruction signal related to the automated drive control to the vehicle control ECU 20 via a CAN when an expected travel route (route for guidance) for the vehicle is decided. The vehicle control ECU 20 executes the automated drive control after the start of travel in accordance with the received instruction signal. The content of the instruction signal includes information for specifying the expected travel route (route for guidance) and information for setting the control content (such as straight travel, a lane change to the right, and a lane merge, for example) of the automated drive control to be performed on the vehicle in the automated drive section which is included in the expected travel route.

Figure 2:
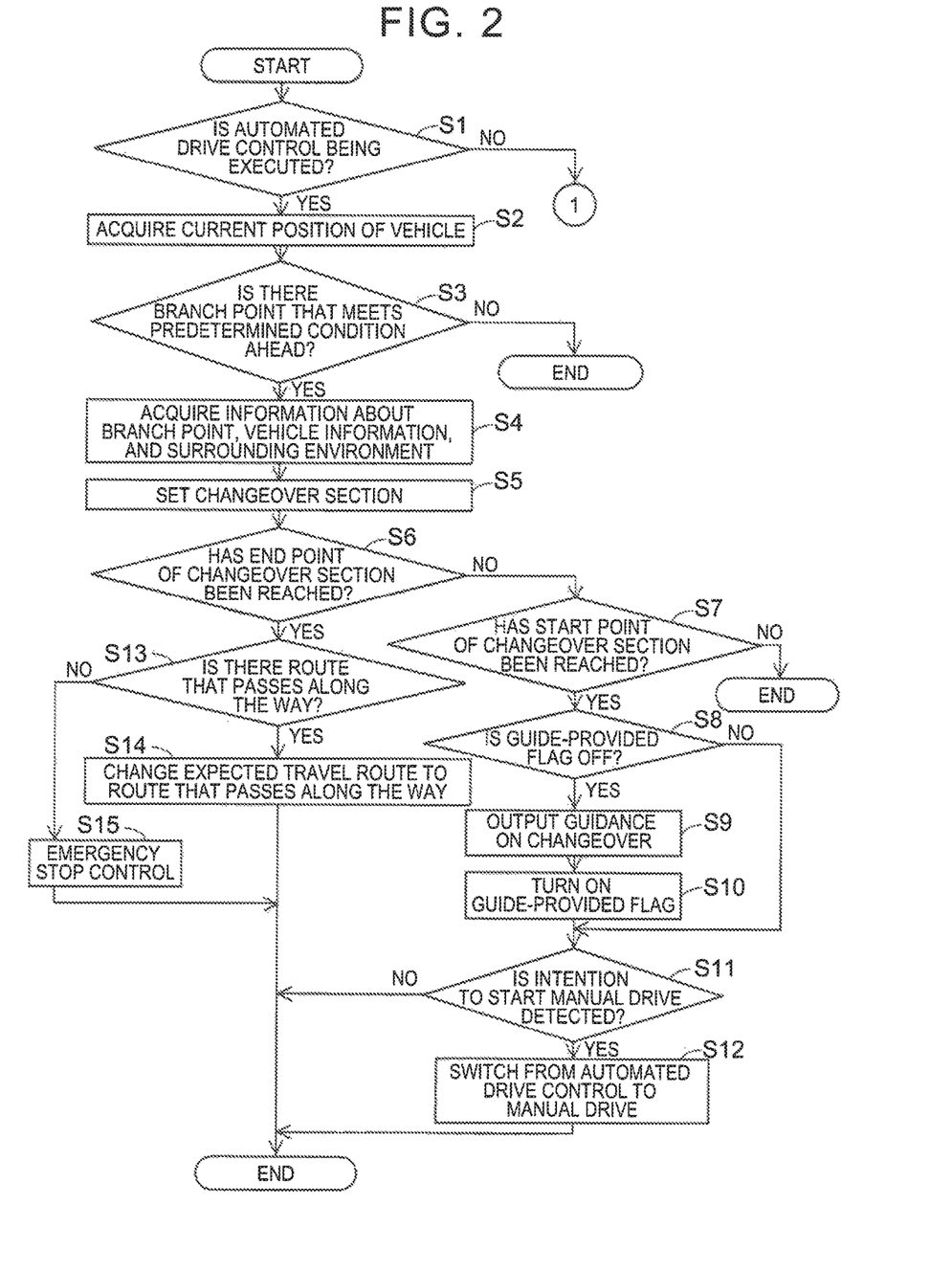
FIG. 2 is a flowchart of a travel assist processing program according to the embodiment.
Figure 3:
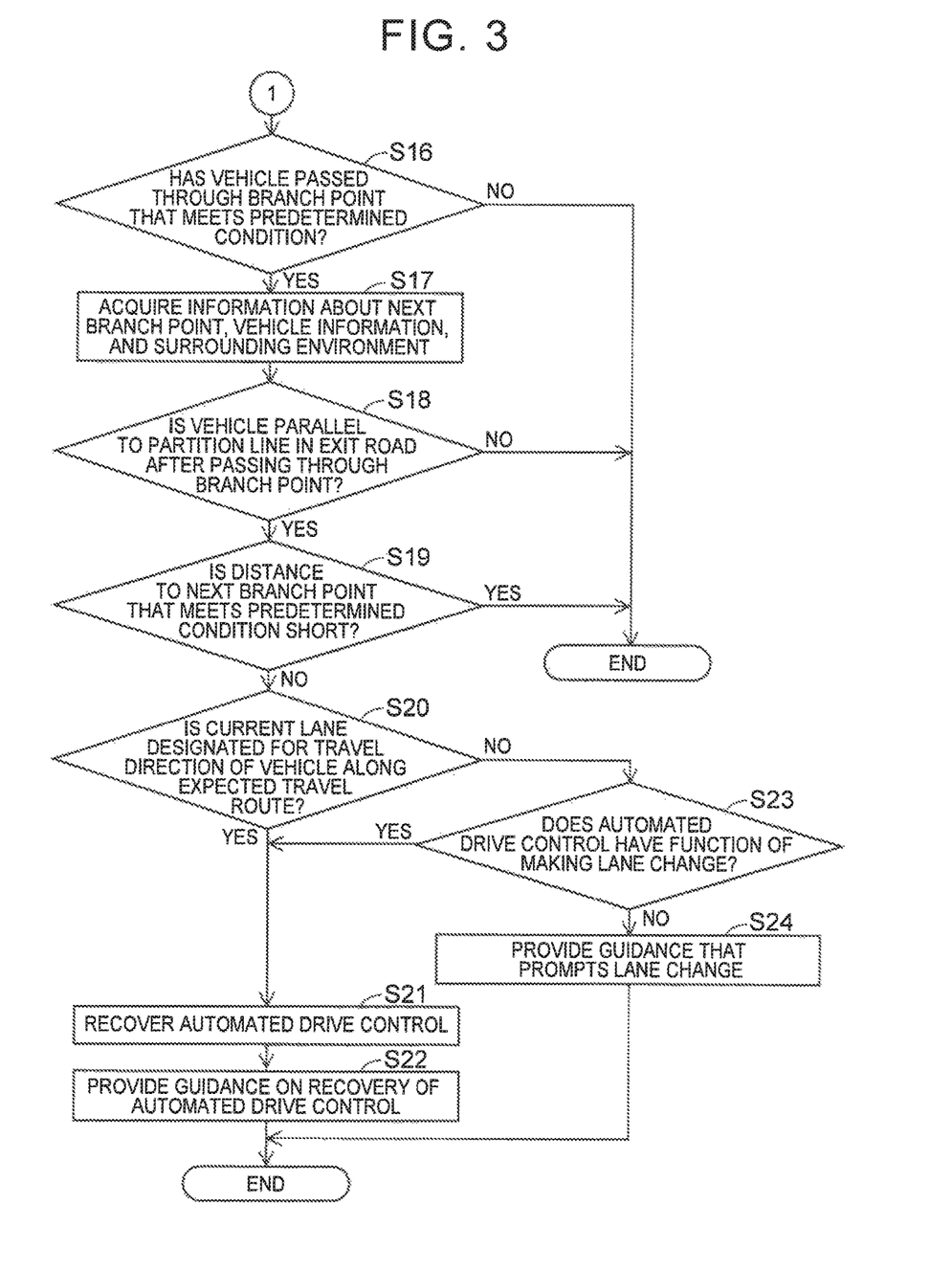
FIG. 3 is a flowchart of the travel assist processing program according to the embodiment.

Subsequently, a travel assist processing program executed by the CPU 41 of the navigation apparatus 1 according to the embodiment configured as described above will be described with reference to FIGS. 2 and 3. FIGS. 2 and 3 are each a flowchart of a travel assist processing program according to the embodiment. The travel assist processing program is a program executed at predetermined intervals (e.g. intervals of 100 ms) after the expected travel route (route for guidance) for the vehicle is decided to assist travel through the automated drive control. The expected travel route is decided by executing route search processing using a Dijkstra's algorithm known in the art when the user sets a destination location at the start of travel, for example, and the user operating to select one of a plurality of candidate routes. The program illustrated in the flowcharts of FIGS. 2 and 3 described below is stored in the RAM 42 or the ROM 43 of the navigation apparatus 1, and executed by the CPU 41.

In the travel assist processing program, first, in step (hereinafter abbreviated as "S") 1, the CPU 41 determines whether or not the automated drive control for the vehicle is being executed.

The automated drive control is performed in the case where the vehicle travels in the automated drive section, and only in situations where the user selects performing the automated drive control and it is determined that the vehicle can travel through the automated drive control. In the embodiment, the automated drive section is defined as all road sections that include general roads and highways. In addition, whether or not the user selects performing the automated drive control is determined in accordance with whether or not the automated drive start button is depressed, for example. The automated drive start button is disposed in an instrument panel or the like, and depressed when the user desires to switch between the automated drive control and the manual drive. Specifically, when the automated drive start button is depressed with the vehicle traveling through the manual drive in the automated drive section, the automated drive control is started. When the automated drive start button is depressed during execution of the automated drive control, meanwhile, the automated drive control is ended even during travel in the automated drive section, and switching is made to the manual drive. Examples of the situations where it is determined that the vehicle cannot travel through the automated drive control include a case where the vehicle travels in a section in which a lane change or a lane merge is required within a predetermined distance, a case where the vehicle travels in a section in which a partition line has disappeared or faded to such a degree that the partition line cannot be recognized using a camera, and a case where the vehicle travels through a branch point that meets a predetermined condition as discussed later.

In the case where it is determined that the automated drive control for the vehicle is being executed (S1: YES), the processing proceeds to S2. In contrast, in the case where it is determined that the automated drive control for the vehicle is not being executed (S1: NO), that is, during travel through the manual drive, the processing proceeds to S16.

In S2, the CPU 41 acquires the current position of the vehicle on the basis of the result of the detection performed by the current position detection section 11. Map matching processing in which the current position of the vehicle is specified on map data is also performed. Furthermore, it is desirable that the current position of the vehicle should be specified precisely using a high-precision location technique. In the high-precision location technique, white lines and road paint information taken from a camera provided in rear of the vehicle are detected through image recognition and further collated with a map information DB that stores white lines and road paint information in advance to detect the lane in which the vehicle is traveling and the precise vehicle position. The details of the high-precision location technique are already known in the art, and thus are not described herein.

Figure 4:
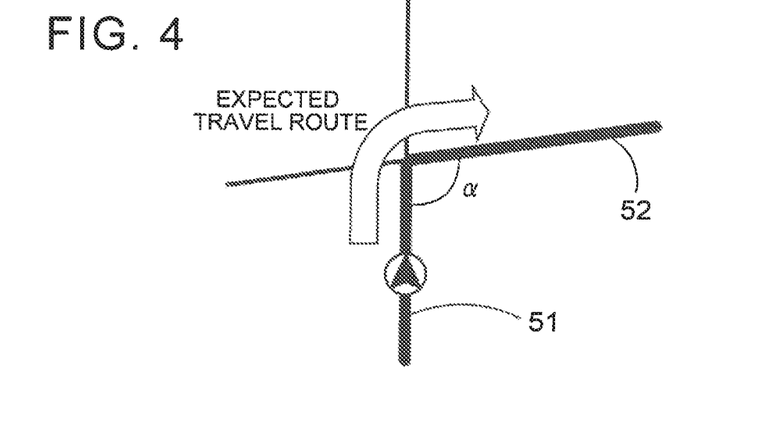
FIG. 4 illustrates a branch point that meets a predetermined condition.

Next, in S3, the CPU 41 determines, on the basis of the current position of the vehicle acquired in S2 and the map information stored in the map information DB 31, whether or not there is a branch point that meets the predetermined condition ahead in the travel direction of the vehicle (e.g. within 1 km). The branch point that meets the predetermined condition refers to such a branch point that an entry road for entry into the branch point and an exit road for exit from the branch point in the case where the vehicle travels along the expected travel route are not on the along-the-way relationship. Being "not on the along-the-way relationship" indicates that the angle of connection between an entry road 51 and an exit road 52 is within a predetermined range (e.g. 30 degrees to 150 degrees) as illustrated in FIG. 4. That is, the branch point that meets the predetermined condition may also be a branch point that requires a change in vehicle orientation of a predetermined angle (e.g. 30 degrees) or more in the case where the vehicle travels along the expected travel route. Such a branch point requires complicated vehicle operations for a right or left turn or special attention to pedestrians and bicycles when the vehicle passes through the branch point. Thus, it is determined that the vehicle cannot travel through the branch point through the automated drive control, and a changeover to the manual drive is made when the vehicle passes through the branch point as discussed later.

In the case where it is determined that there is a branch point that meets the predetermined condition ahead in the travel direction of the vehicle (S3: YES), the processing proceeds to S4. In the case where it is determined that there is not a branch point that meets the predetermined condition ahead in the travel direction of the vehicle (S3: NO), in contrast, the travel assist processing program is ended. After that, the vehicle continues to travel through the automated drive control.

In S4, the CPU 41 acquires information about the branch point that meets the predetermined condition located ahead in the travel direction of the vehicle, information about the vehicle, and the surrounding environment of the vehicle. Specifically, the CPU 41 acquires the following information.

(1) The distance from the vehicle to the branch point that meets the predetermined condition located ahead in the travel direction.

(2) The distance from the vehicle to a stop line provided at the branch point (in the case where there is no stop line, it is assumed that a stop line is present a predetermined distance (e.g. 1 m) before the location of the start of entry into the branch point).

(3) The lane configuration (such as the number of lanes and the travel direction designation of each lane) of each of the entry road for entry into the branch point and the exit road for exit from the branch point in the case where the vehicle travels along the expected travel route.

(4) The position of the lane in which the vehicle is currently traveling.

The information (1) to (4) is acquired by reading information from the map information DB 31, acquiring the result of the detection performed by the vehicle exterior camera 19 and the other various sensors, or communicating with an external server such as the VICS center or a probe center.

After that, in S5, the CPU 41 sets a changeover section, in which a changeover from the automated drive control to the manual drive is made, before the branch point located ahead in the travel direction. Specifically, a start point and an end point of a changeover section are decided in accordance with the following criteria, and a section between the start point and the end point is set as the changeover section. The range of the changeover section to be set is varied in accordance with whether or not the automated drive control has a function of making a lane change as discussed later.

(A) Start Point of Switchover Section (a) In the case where the automated drive control does not have the function of making a lane change: a location positioned farther away from the branch point along the expected travel route than the end point of the changeover section and a predetermined distance (e.g. 700 m) before the stop line provided at the branch point.

(b) In the case where the automated drive control has the function of making a lane change: a location positioned farther away from the branch point along the expected travel route than the end point of the changeover section and being one of the following locations that is the closer to the branch point: "a location at which the vehicle has been moved to a lane designated for the travel direction for the vehicle to pass through the branch point along the expected travel route (e.g. a right-turn-only lane in the case where the vehicle is to make a right turn)"; and "a location a predetermined distance (e.g. 700 m) before the stop line provided at the branch point."

(B) End Point of Switchover Section

A location that allows the vehicle to stop at the stop line provided at the branch point (in the case where there is no stop line, it is assumed that a stop line is present a predetermined distance (e.g. 1 m) before the location of the start of entry into the branch point) by decelerating at a deceleration of a threshold or less and that is the closest to the stop line. The threshold is the upper limit value of the deceleration that does not impose a significant burden on the vehicle or the passengers. In the embodiment, in the case where a changeover from the automated drive control to the manual drive is not made in the changeover section, the vehicle is subjected to an emergency stop in some cases (S15). Thus, the end point of the changeover section is determined as the limit location that allows the vehicle to stop at the stop line without imposing a significant burden on the vehicle or the passengers in such cases.

Figure 5:
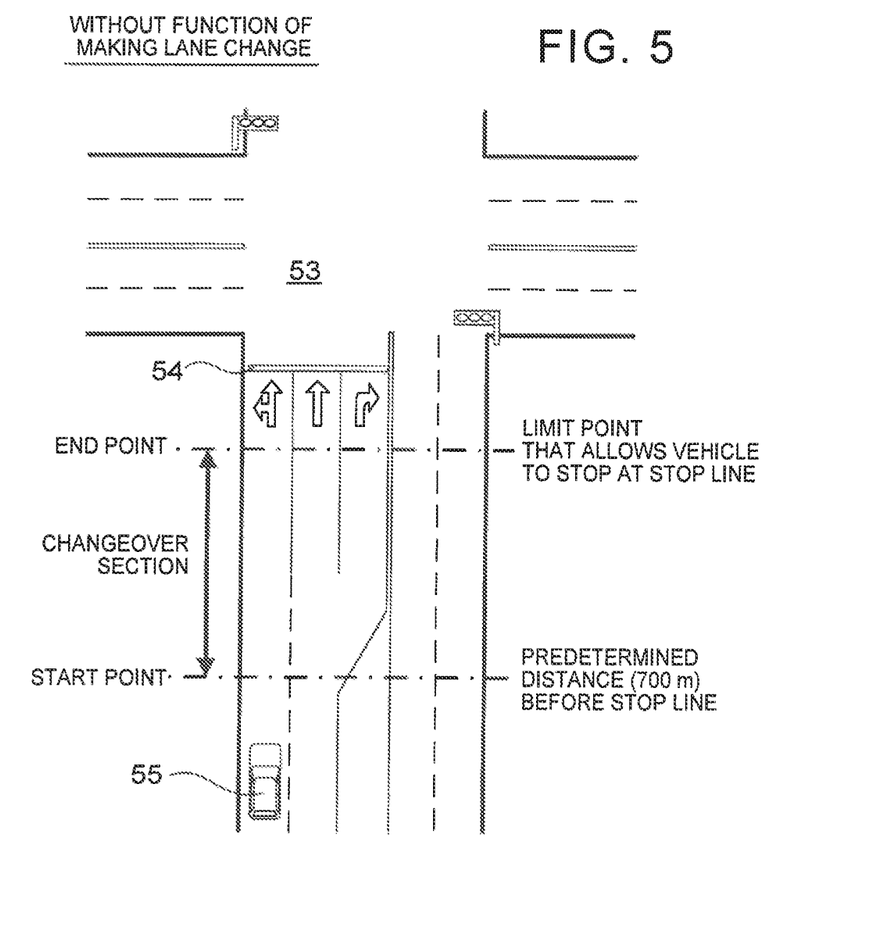
FIG. 5 illustrates an example of a changeover section set in the case where automated drive control does not have a function of making a lane change.

For example, FIG. 5 illustrates an example of a changeover section set in the case where the automated drive control does not have the function of making a lane change. As illustrated in FIG. 5, in the case where the automated drive control does not have the function of making a lane change, a section from a location a predetermined distance (e.g. 700 m) before a stop line 54 provided at a branch point 53 to a location that allows the vehicle to stop at the stop line 54 by decelerating at a deceleration of a threshold or less and that is the closest to the stop line is set as the changeover section.

Figure 6:
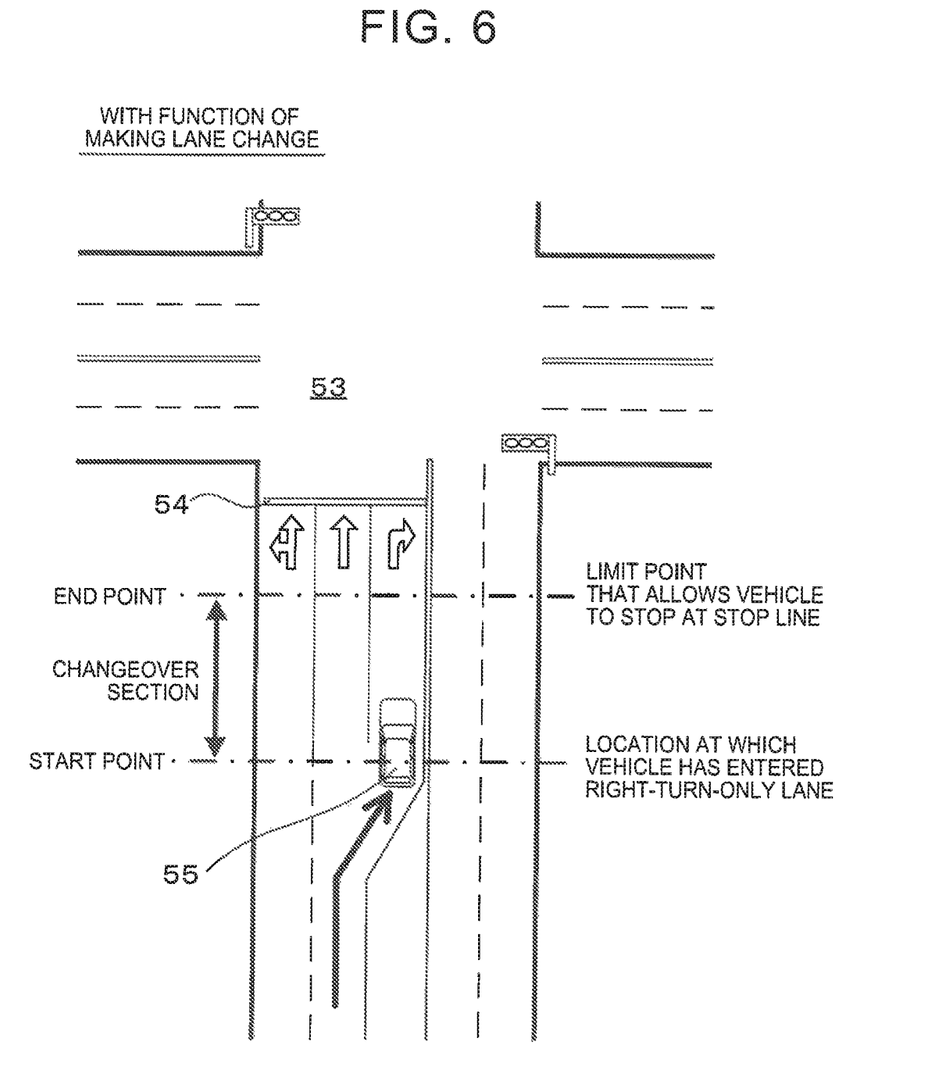
FIG. 6 illustrates an example of a changeover section set in the case where automated drive control has the function of making a lane change.

On the other hand, FIG. 6 illustrates an example of a changeover section set in the case where the automated drive control has the function of making a lane change. As illustrated in FIG. 6, in the case where the automated drive control has the function of making a lane change and a vehicle 55 makes a right turn to pass through the branch point 53, a section from a location at which the vehicle 55 has been moved to a right-turn-only lane to a location that allows the vehicle to stop at the stop line 54 by decelerating at a deceleration of a threshold or less and that is the closest to the stop line is set as the changeover section. In the case where the vehicle 55 makes a left turn to pass through the branch point 53 and the vehicle is already traveling in a lane on the leftmost side from which a left turn can be made, a location a predetermined distance (e.g. 700 m) before the stop line 54 provided at the branch point 53 is set as the start point of the changeover section.

After that, in S6, the CPU 41 determines, on the basis of the current position of the vehicle acquired in S2 and the changeover section set in S5, whether or not the vehicle has already reached the end point of the changeover section.

In the case where it is determined that the vehicle has already reached the end point of the changeover section (S6: YES), the processing proceeds to S13. In the case where it is determined that the vehicle has not reached the end point of the changeover section (S6: NO), in contrast, the processing proceeds to S7.

In S7, the CPU 41 determines, on the basis of the current position of the vehicle acquired in S2 and the changeover section set in S5, whether or not the vehicle has already reached the start point of the changeover section.

In the case where it is determined that the vehicle has already reached the start point of the changeover section (S7: YES), the processing proceeds to S8. In the case where it is determined that the vehicle has not even reached the start point of the changeover section (S7: NO), in contrast, the travel assist processing program is ended.

In S8, the CPU 41 reads a guide-provided flag stored in the RAM 42, and determines whether or not the guide-provided flag is off. The guide-provided flag is a flag that indicates whether or not guidance that prompts a changeover from the automated drive control to the manual drive has been provided when the vehicle is to pass through the branch point located ahead in the travel direction. The guide-provided flag is set to off in the initial state, and turned on in S10 to be discussed later.

In the case where it is determined that the guide-provided flag is off (S8: YES), it is acknowledged that guidance that prompts a changeover from the automated drive control to the manual drive has not been provided so far, and the processing proceeds to S9. In the case where it is determined that the guide-provided flag is on (S8: NO), in contrast, it is acknowledged that guidance that prompts a changeover from the automated drive control to the manual drive has already been provided, and the processing proceeds to S11.

In S9, the CPU 41 outputs, from the liquid crystal display 15 or the speaker 16, guidance that prompts a changeover from the automated drive control to the manual drive. As a result, guidance that prompts a changeover from the automated drive control to the manual drive is provided when the vehicle reaches the start point of the changeover section set in S5. For example, audio that says "Turn right ○○ m ahead. Change over to manual drive." is output.

After that, in S10, the CPU 41 reads the guide-provided flag stored in the RAM 42, and sets the guide-provided flag to on.

Next, in S11, the CPU 41 determines whether or not the user is detected to have made a predetermined indication of intention to start the manual drive. The predetermined indication of intention is an operation of one of a steering unit, a brake unit, an accelerator, a shift lever, and an automated drive start button of the vehicle. Whether or not the steering unit, the brake unit, the accelerator, and the shift lever of the vehicle are operated is determined by receiving a signal from the vehicle control ECU 20. Particularly for an operation of the steering unit, the brake unit, and the accelerator, it is desirable to determine that the user has made the predetermined indication of intention to start the manual drive in the case where an operation is made by a certain amount or more or an operation has been made continuously for a certain time or more in order to prevent erroneous detection.

In the case where it is determined that the user is detected to have made the predetermined indication of intention to start the manual drive (S11: YES), the processing proceeds to S12. In the case where it is determined that the user is not detected to have made the predetermined indication of intention to start the manual drive (S11: NO), the travel assist processing program is ended. Thus, if the user is detected to have made the predetermined indication of intention to start the manual drive before the vehicle reaches the end point of the changeover section, the processes in and after S12 are executed. In the case where the user is not detected to have made the predetermined indication of intention to start the manual drive before the vehicle reaches the end point of the changeover section, on the other hand, the processes in and after S13 are executed.

Figure 7:
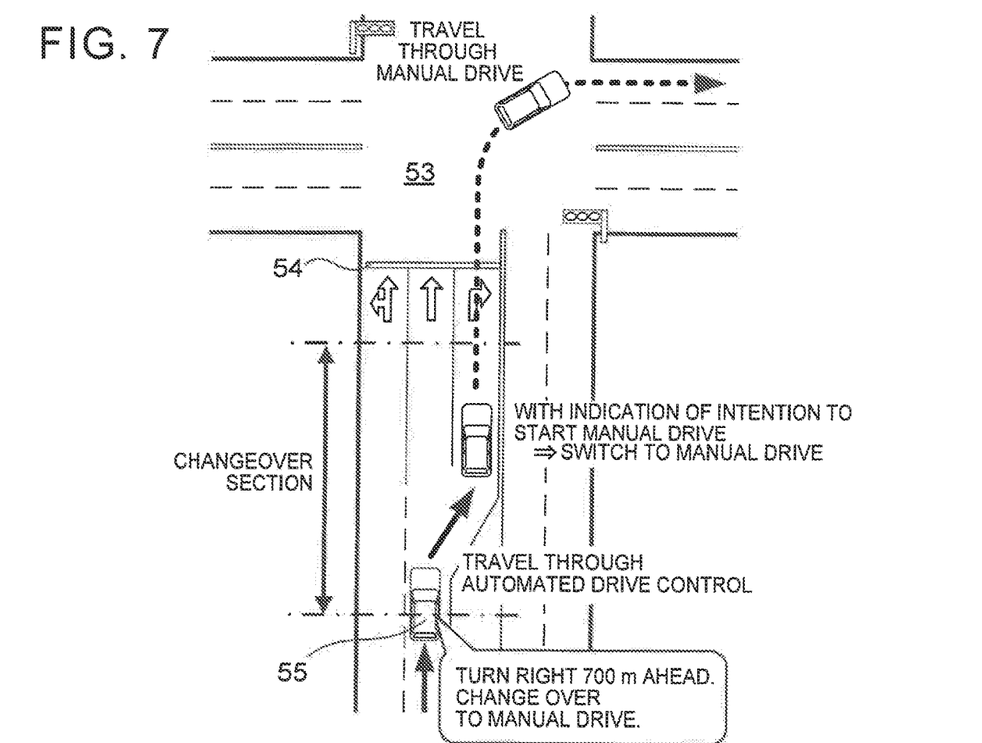
FIG. 7 illustrates a manner of switching between travel through the automated drive control and travel through manual drive when a vehicle passes through a branch point.

In S12, the CPU 41 transmits an instruction signal to the vehicle control ECU 20 via a CAN, temporarily stops the automated drive control and makes a changeover to the manual drive. As a result, the automated drive control for the vehicle is temporarily stopped, and switching is made to the manual drive. After that, as illustrated in FIG. 7, the user makes an operation for a right or left turn etc. required at the branch point so that the vehicle passes through the branch point along the expected travel route. Travel based on the manual drive after the switching made in S12 is performed continuously at least until the vehicle exits from the branch point as discussed later. After the vehicle exits from the branch point, and when a certain recovery condition is met, the automated drive control is recovered (S21), either automatically or in the case where the user has made an indication of intention. The recovery of the automated drive control will be discussed in detail later.

In S13 which is executed in the case where it is determined in S16 that the vehicle has reached the end point of the changeover section (S6: YES), on the other hand, the CPU 41 determines whether or not there exists a route that passes through the branch point, which is located ahead in the travel direction of the vehicle, along the way. Specifically, it is determined that there exists a route that passes through the branch point along the way in the case where there is an exit road, the angle of connection of which with the entry road for entry into the branch point, through which the vehicle is to travel, is within a predetermined range (e.g. α=150 degrees to 210 degrees in the example illustrated in FIG. 4) (i.e. in the case where there is a route, along which the vehicle can travel by making a change in vehicle orientation of less than a predetermined angle (e.g. 30 degrees)). Even in the case where there is an exit road, the angle of connection of which with the entry road for entry into the branch point, through which the vehicle is to travel, is within a predetermined range, it may be determined that there does not exist a route that passes through the branch point, which is located ahead in the travel direction of the vehicle, along the way in the case where the exit road is a road that is not suitable for the vehicle to travel on such as a narrow street.

In the case where it is determined that there exists a route that passes through the branch point, which is located ahead in the travel direction of the vehicle, along the way (S13: YES), the processing proceeds to S14. In the case where it is determined that there does not exist a route that passes through the branch point, which is located ahead in the travel direction of the vehicle, along the way (S13: NO), in contrast, the processing proceeds to S15.

In S14, the CPU 41 changes the expected travel route (route for guidance) for the vehicle set in the navigation apparatus 1 to a route that passes through the branch point, which is located ahead in the travel direction of the vehicle, along the way. In the case where the vehicle passes through the branch point along the way, complicated vehicle operations for a right or left turn or special attention to pedestrians and bicycles is not required, and thus the vehicle can pass through the branch point along the expected travel route even if the vehicle continues to travel through the automated drive control without switching to the manual drive. After that, the travel assist processing program is ended.

In S15, the CPU 41 transmits an instruction signal to the vehicle control ECU 20 via a CAN to subject the vehicle to an emergency stop. As a result, the vehicle is stopped before entering the branch point. The vehicle is basically controlled so as to be stopped before the stop line. In the case where the traffic signal is green or in the case where the road on which the vehicle travels is a priority road, however, the vehicle may be stopped past the stop line (at a position at which the vehicle has entered the branch point). Alternatively, the vehicle may be decelerated to a certain speed or less rather than being stopped. As a result of performing control so as to stop the vehicle in S15, the vehicle can be prevented from passing through the branch point with the automated drive control continued. After that, the travel assist processing program is ended.

In S16 which is executed in the case where it is determined in S1 that the vehicle has been traveling through the manual drive (S1: NO), meanwhile, the CPU 41 determines whether or not the vehicle has passed through a branch point that meets a predetermined condition. As in S3, the branch point that meets the predetermined condition refers to such a branch point that an entry road for entry into the branch point and an exit road for exit from the branch point in the case where the vehicle travels along the expected travel route are not on the along-the-way relationship. That is, in S16, it is determined, on the basis of a drive operation by the user, whether or not the vehicle, which was subjected to a changeover from the automated drive control to the manual drive in S12, has thereafter passed through a branch point located ahead in the travel direction.

In the case where it is determined that the vehicle has passed through the branch point that meets the predetermined condition (S16: YES), the processing proceeds to S17. In the case where it is determined that the vehicle has not passed through the branch point that meets the predetermined condition (S16: NO), in contrast, the travel assist processing program is ended, and the vehicle continues to travel through the manual drive.

In S17, the CPU 41 acquires information about the next branch point located ahead in the travel direction of the vehicle, information about the vehicle, and the surrounding environment of the vehicle. Specifically, the CPU 41 acquires the following information.

(1) The distance from the vehicle to the next branch point located ahead in the travel direction.

(2) The lane configuration (such as the number of lanes and the travel direction designation of each lane) of a road that the vehicle has entered after exiting from the branch point that meets the predetermined condition (i.e. a road on which the vehicle is currently traveling).

(3) The position of the lane in which the vehicle is currently traveling.

The information (1) to (3) is acquired by reading information from the map information DB 31, acquiring the result of the detection performed by the vehicle exterior camera 19 and the other various sensors, or communicating with an external server such as the VICS center or a probe center.

Subsequently, in S18, the CPU 41 determines whether or not the orientation of the vehicle has become parallel to a partition line of a road that the vehicle has entered after exiting from the branch point that meets the predetermined condition (i.e. a road on which the vehicle is currently traveling). The orientation of the vehicle is detected by the gyro sensor 25 or the like, and the partition line is detected from an image captured by the vehicle exterior camera 19. It is not necessary that the vehicle and the partition line should be perfectly parallel to each other, and it is desirable to consider that the vehicle and the partition line are parallel to each other if the difference in orientation is a predetermined angle or less (e.g. five degrees or less).

In the case where it is determined that the orientation of the vehicle has become parallel to the partition line of the road that the vehicle has entered after exiting from the branch point that meets the predetermined condition (S18: YES), the processing proceeds to S19. In the case where it is determined that the orientation of the vehicle has not become parallel to the partition line of the road that the vehicle has entered after exiting from the branch point that meets the predetermined condition (S18: NO), in contrast, the travel assist processing program is ended, and the vehicle continues to travel through the manual drive.

In S19, the CPU 41 determines whether or not the next branch point that appears along the expected travel route is located within a predetermined distance (e.g. within 700 m) from the branch point that meets the predetermined condition and passed through by the vehicle and the next branch point is also a branch point that meets the predetermined condition.

In the case where the next branch point that appears along the expected travel route is located within a predetermined distance from the branch point that meets the predetermined condition and passed through by the vehicle and the next branch point is also a branch point that meets the predetermined condition (S19: YES), it is necessary to make a changeover to the manual drive again immediately thereafter even if the automated drive control is recovered. Thus, the travel assist processing program is ended without recovering the automated drive control, and control is performed such that the vehicle continues to travel through the manual drive.

In the case where the next branch point that appears along the expected travel route is not located within a predetermined distance from the branch point that meets the predetermined condition and passed through by the vehicle, or in the case where it is determined that the next branch point that appears along the expected travel route is located within a predetermined distance from such a branch point but is not a branch point that meets the predetermined condition (S19: NO), the processing proceeds to S20.

Figure 8:
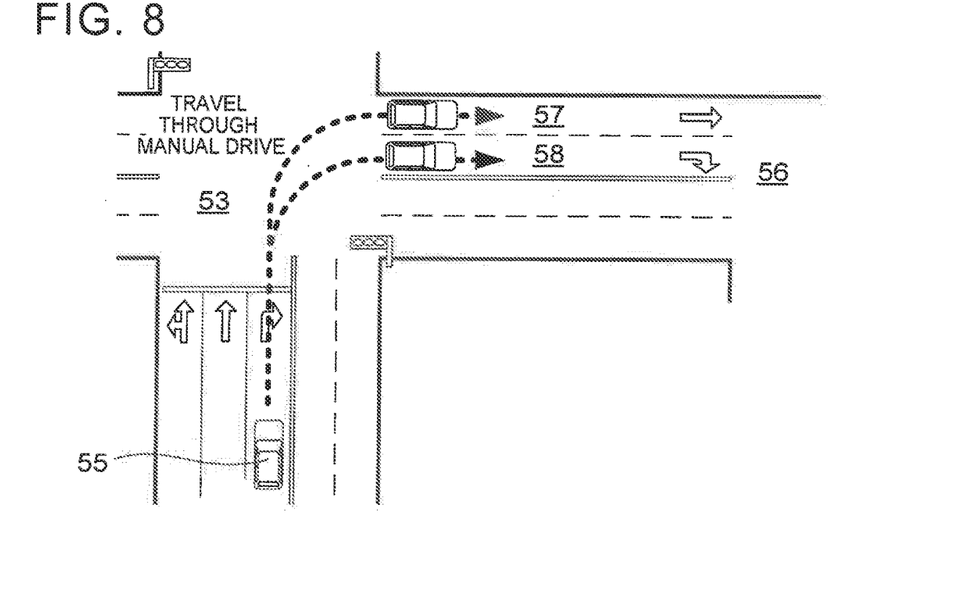
FIG. 8 illustrates a condition for recovering the automated drive control.

In S20, the CPU 41 determines whether or not the lane in which the vehicle is currently traveling is a lane designated for the travel direction of the vehicle along the expected travel route. For example, in the case where the vehicle 55 has passed through the branch point 53 that meets the predetermined condition through the manual drive and the expected travel route for the vehicle 55 suggests that the vehicle 55 should travel straight through a next branch point 56 as illustrated in FIG. 8, it is determined that the lane in which the vehicle is currently traveling is a lane designated for the travel direction of the vehicle along the expected travel route if the vehicle 55 has entered a left lane 57 after exiting from the branch point 53. In the case where the expected travel route for the vehicle 55 suggests that the vehicle 55 should make a right turn at the next branch point 56, meanwhile, it is determined that the lane in which the vehicle is currently traveling is a lane designated for the travel direction of the vehicle along the expected travel route if the vehicle 55 has entered a right lane 58 after exiting from the branch point 53. Guidance on a lane that the vehicle 55 should enter after exiting from the branch point 53 (a lane designated for the travel direction of the vehicle along the expected travel route) may be provided in advance when or before the vehicle 55 passes through the branch point 53. For example, guidance that says "Enter the left lane after turning right" may be provided.

In the case where it is determined that the lane in which the vehicle is currently traveling is a lane designated for the travel direction of the vehicle along the expected travel route (S20: YES), the processing proceeds to S21. In the case where it is determined that the lane in which the vehicle is currently traveling is not a lane designated for the travel direction of the vehicle along the expected travel route (S20: NO), in contrast, the processing proceeds to S23.

In S21, the CPU 41 transmits an instruction signal to the vehicle control ECU 20 via a CAN to switch the travel mode of the vehicle from the manual drive based on a drive operation by the user to travel through the automated drive control. As a result, the vehicle control ECU 20 which has received the instruction signal starts a processing related to the automated drive control, and the vehicle resumes travel through the automated drive control. After that, the processing proceeds to S22.

In S21, travel through the automated drive control may be recovered on condition that the user is detected to have made a predetermined indication of intention to start the automated drive control. The predetermined indication of intention is an operation of the automated drive start button. In addition, the user may be considered to have made a predetermined indication of intention to start the automated drive control in the case where a steering unit, a brake unit, and an accelerator of the vehicle are not operated for a certain time (e.g. five seconds) or more, besides an operation of the automated drive start button. Whether the steering unit, the brake unit, and the accelerator of the vehicle are not operated for a certain time or more is determined by receiving a signal from the vehicle control ECU 20.

Next, in S22, the CPU 41 outputs, from the liquid crystal display 15 or the speaker 16, guidance indicating that the automated drive control has been recovered. For example, audio that says "Automated drive is started." is output. After that, the travel assist processing program is ended.

In S23, meanwhile, the CPU 41 determines whether or not the automated drive control has the function of making a lane change.

In the case where it is determined that the automated drive control has the function of making a lane change (S23: YES), the processing proceeds to S21. In the case where it is determined that the automated drive control does not have the function of making a lane change (S23: NO), in contrast, the processing proceeds to S24.

Figure 9:
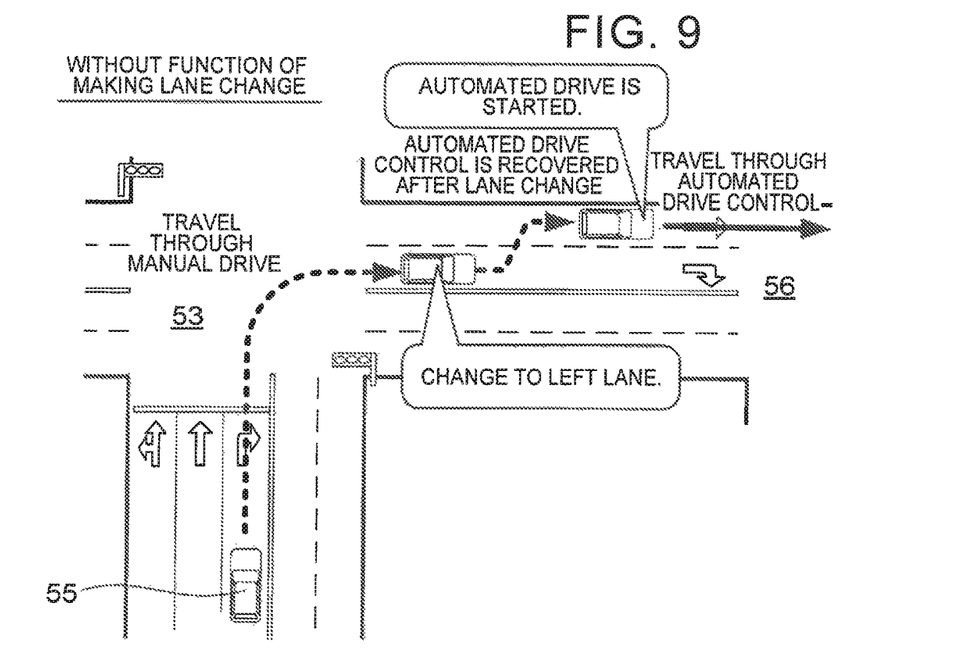
FIG. 9 illustrates a manner of recovering the automated drive control in the case where the automated drive control does not have the function of making a lane change.

In S24, the CPU 41 outputs, from the liquid crystal display 15 or the speaker 16, guidance that prompts a lane change. Specifically, guidance on a change to a lane designated for the travel direction of the vehicle along the expected travel route is provided. For example, audio that says "Change to the left (right) lane." is output. After that, the travel assist processing program is ended. If the user makes a lane change in accordance with the guidance after that and the lane in which the vehicle is currently traveling is a lane designated for the travel direction of the vehicle along the expected travel route as illustrated in FIG. 9, the processing proceeds to S21 in the travel assist processing program to be executed next time and thereafter, and the automated drive control is recovered.

Figure 10:
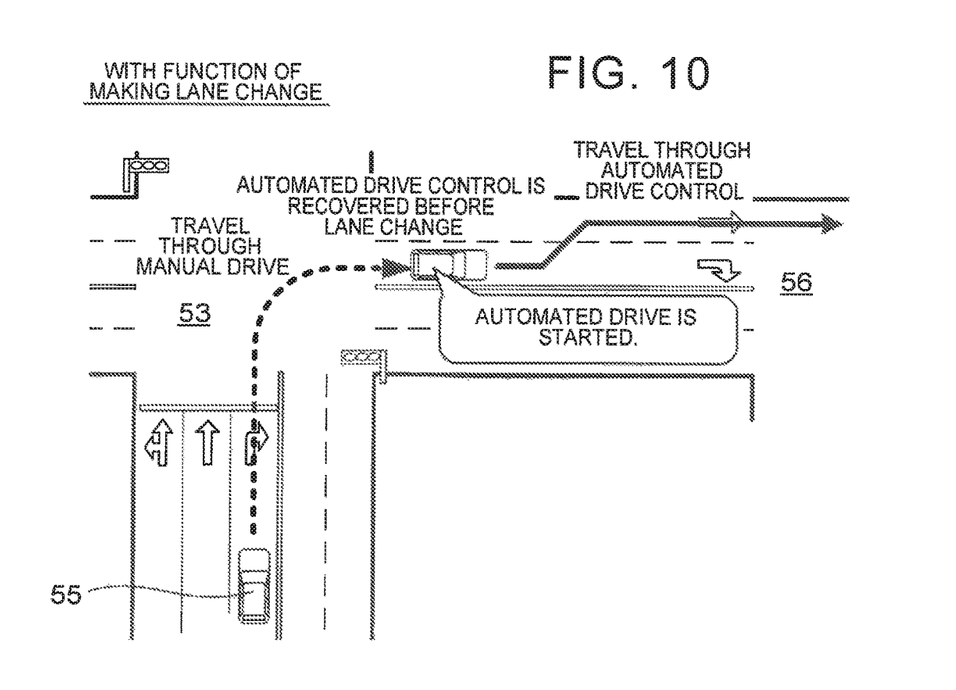
FIG. 10 illustrates a manner of recovering the automated drive control in the case where the automated drive control has the function of making a lane change.

In the case where the automated drive control has the function of making a lane change (S23: YES), on the other hand, a lane change is made automatically after the automated drive control is recovered and the vehicle changes to a lane designated for the travel direction of the vehicle along the expected travel route as illustrated in FIG. 10.

With the navigation apparatus 1 according to the embodiment, an automated drive assisting method performed by the navigation apparatus 1, and a computer program executed by the navigation apparatus 1, as has been described above, a changeover from the automated drive control to the manual drive based on a drive operation by the user is made (S12) in the case where the vehicle is traveling through the automated drive control in the automated drive section in which the automated drive control for the vehicle is permitted and there is a branch point that meets a predetermined condition ahead in the travel direction of the vehicle; and the automated drive control is recovered (S21) after the vehicle passes through the branch point that meets the predetermined condition while traveling on the basis of the manual drive based on a drive operation by the user after the changeover. Thus, it is possible for the vehicle which passes through the branch point to appropriately make a changeover from the automated drive control to the manual drive, and to recover the automated drive control after the changeover. Thus, even in the case where general roads are included in a section in which travel through the automated drive control is permitted, it is possible for the vehicle to travel while switching between travel through the automated drive control and travel through the manual drive at appropriate timings in accordance with the situations.

It should be understood that the embodiment described above is not limiting, and that various improvements and modifications may be made without departing from the scope and spirit.

In the embodiment, for example, a changeover from the automated drive control to the manual drive based on a drive operation by the user is made in the case where there is a branch point that meets a predetermined condition ahead in the travel direction of the vehicle, and the branch point that meets the predetermined condition is such a branch point that an entry road for entry into the branch point and an exit road for exit from the branch point in the case where the vehicle travels along the expected travel route are not on the along-the-way relationship. However, the predetermined condition may be changed as appropriate. For example, the branch point that meets the predetermined condition may be a branch point with no traffic signal, a branch point of four or more roads, or a branch point, an entry road into which is not a priority road.

In the embodiment, switching from the automated drive control to the manual drive is made in the case where the user has made a predetermined indication of intention to start the manual drive. However, switching from the automated drive control to the manual drive may be made automatically when the vehicle has entered a changeover section irrespective of an indication of intention by the user.

In the embodiment, the expected travel route for the vehicle is changed to a route that passes through the branch point along the way in the case where the user is not detected to have made a predetermined indication of intention to start the manual drive before the vehicle reaches the end point of the changeover section. However, the vehicle may first be caused to pass through the branch point along the way through the automated drive control, and the expected travel route may be changed (a re-search is made) on the basis of the current position of the vehicle thereafter.

In the embodiment, the travel assist processing program (FIGS. 2 and 3) is executed by the navigation apparatus 1. However, the travel assist processing program may be executed by the vehicle control ECU 20. In such a case, the vehicle control ECU 20 acquires the current position of the vehicle and the map information from the navigation apparatus 1.

In the embodiment, automated drive control for automatic travel, which does not rely on drive operations by the user, has been described as control in which the vehicle control ECU 20 controls all the operations including an accelerator operation, a brake operation, and a steering operation, which are related to the behavior of the vehicle, among operations on the vehicle. However, automated drive control may be control in which the vehicle control ECU 20 controls at least one of the operations including an accelerator operation, a brake operation, and a steering operation, which are related to the behavior of the vehicle, among operations on the vehicle. On the other hand, manual drive, which relies on drive operations by the user, is described as drive in which the user performs all of the operations including an accelerator operation, a brake operation, and a steering operation, which are related to the behavior of the vehicle, among operations on the vehicle.

The above-described principles can be applied to devices that have a function of providing guidance on travel along a route for guidance, besides the navigation apparatus. For example, the above-described principles may also be applied to devices such as a cellular phone, a smartphone, a tablet terminal, and a personal computer (hereinafter referred to as a portable terminal etc.). The above-described principles may also be applied to a system composed of a server and a portable terminal etc. In this case, each step of the travel assist processing program (FIGS. 2 and 3) discussed above may be performed by any of the server and the portable terminal etc. It should be noted, however, that in the case where the above-described principles are applied to the portable terminal etc., it is necessary that the vehicle which can be subjected to the automated drive control and the portable terminal etc. should be connected so as to communicate with each other (either through a wire or wirelessly).

While an automated drive assisting system according to a specific embodiment has been described above, the automated drive assisting system may be configured as described below, and the following effect can be achieved in such cases.

For example, a first configuration is as follows.

The automated drive assisting system has: route acquisition means (41) for acquiring an expected travel route for a vehicle (55) that includes an automated drive section in which automated drive control for the vehicle is permitted; control execution means (41) for executing the automated drive control for the vehicle such that the vehicle travels along the expected travel route in the automated drive section which is included in the expected travel route; and control recovery means (41) for recovering the automated drive control after the vehicle, which travels through manual drive based on a drive operation by a user, passes through a branch point that is provided in the automated drive section and that meets a predetermined condition.

With the automated drive assisting system configured as described above, it is possible to enable a vehicle that has passed through a branch point through travel based on manual drive to appropriately recover automated drive control. Thus, even in the case where general roads are included in a section in which travel through the automated drive control is permitted, it is possible for the vehicle to travel while switching between travel through the automated drive control and travel through the manual drive at appropriate timings in accordance with the situations.

A second configuration is as follows.

The automated drive assisting system further includes drive changeover means (41) for making a changeover from the automated drive control to the manual drive at a location before the branch point in the case where the branch point is located ahead in a travel direction of the vehicle (55) which travels through the automated drive control in the automated drive section.

With the automated drive assisting system configured as described above, it is possible for a vehicle that passes through a branch point to appropriately make a changeover from automated drive control to manual drive in the case where there is a branch point that meets a predetermined condition ahead in the travel direction of the vehicle which travels through the automated drive control.

A third configuration is as follows.

The control recovery means (41) recovers the automated drive control after an orientation of the vehicle (55) is detected to have become parallel to a partition line of a road that the vehicle has entered after exiting from the branch point.

With the automated drive assisting system configured as described above, it is possible to recover the automated drive control at the timing when the vehicle can be subjected to the automated drive control after the vehicle exits the branch point. Thus, it is possible to recover the automated drive control as early as possible and at an appropriate timing after the vehicle passes through the branch point.

A fourth configuration is as follows.

The control recovery means (41) recovers the automated drive control in the case where the vehicle (55) passes through the branch point and the vehicle is detected to have entered a lane designated for a travel direction of the vehicle after passing through the branch point along the expected travel route.

With the automated drive assisting system configured as described above, it is possible to recover the automated drive control at the timing when the vehicle can be subjected to the automated drive control after the vehicle exits the branch point. Thus, it is possible to recover the automated drive control as early as possible and at an appropriate timing after the vehicle passes through the branch point.

A fifth configuration is as follows.

The automated drive assisting system further includes lane change guide means (41) for providing guidance that prompts a lane change in the case where the vehicle (55) passes through the branch point and the vehicle is detected to have entered a lane that is different from the lane designated for the travel direction of the vehicle after passing through the branch point along the expected travel route.

With the automated drive assisting system configured as described above, it is possible to provide the user with guidance on a vehicle operation that is necessary to bring the vehicle into a state in which the automated drive control can be executed after the vehicle exits the branch point in the case where the automated drive control does not have a function of making a lane change. Thus, it is possible to recover the automated drive control as early as possible after the vehicle passes through the branch point.

A sixth configuration is as follows.

The automated drive assisting system further includes lane change means (41) for causing the vehicle (55) to change to a lane designated for a travel direction for passing through a next branch point along the expected travel route after the control recovery means (41) recovers the automated drive control.

With the automated drive assisting system configured as described above, it is possible to recover the automated drive control as early as possible after the vehicle passes through the branch point, and to enable the vehicle to travel in a lane in which the vehicle should travel without imposing a burden for a drive operation on the user, in the case where the automated drive control has a function of making a lane change.

A seventh configuration is as follows.

The control recovery means (41) recovers the automated drive control in the case where the user is detected to have made a predetermined indication of intention to start the automated drive control after the vehicle (55) passes through the branch point.

With the automated drive assisting system configured as described above, the automated drive control is recovered at a timing desired by the user. Thus, travel of the vehicle is not hindered by the recovery of the automated drive control.

An eighth configuration is as follows.

The predetermined indication of intention is an operation of an operation section to be operated by the user to start the automated drive control.

With the automated drive assisting system configured as described above, it is possible to appropriately detect an indication of intention by the user who desires to recover the automated drive control via operation means provided in the vehicle.

A ninth configuration is as follows.

The predetermined indication of intention is non-execution of an operation of a steering unit, a brake unit, or an accelerator of the vehicle (55) for a certain time or more.

With the automated drive assisting system configured as described above, it is possible to appropriately detect an indication of intention by the user who desires to recover the automated drive control via each operation means provided in the vehicle.

A tenth configuration is as follows.

The control recovery means (41) does not recover the automated drive control, but rather the means continues the manual drive, in the case where a next branch point along the expected travel route is located within a predetermined distance from the branch point and meets the predetermined condition.

With the automated drive assisting system configured as described above, the automated drive control is not recovered in a situation where it is necessary to make a changeover to the manual drive again immediately thereafter even if the automated drive control is recovered. Thus, it is possible to prevent changeovers between the automated drive control and the manual drive from being made successively in a short period. As a result, it is possible to reduce the burden related to drive on the user.

An eleventh configuration is as follows.

The branch point that meets the predetermined condition is such a branch point that an entry road for entry into the branch point and an exit road for exit from the branch point in the case where the vehicle (55) travels along the expected travel route are not on an along-the-way relationship.

With the automated drive assisting system configured as described above, it is possible to accurately specify a branch point through which it is difficult for the vehicle to pass through the automated drive control. Thus, it is possible to allow the vehicle to travel appropriately by switching to travel through the manual drive in a necessary section while allowing the vehicle to travel through the automated drive control as much as possible.

A twelfth configuration is as follows.

The branch point that meets the predetermined condition is a branch point that requires a change in vehicle orientation of a predetermined angle or more in the case where the vehicle (55) travels along the expected travel route.

With the automated drive assisting system configured as described above, it is possible to accurately specify a branch point through which it is difficult for the vehicle to pass through the automated drive control. Thus, it is possible to allow the vehicle to travel appropriately by switching to travel through the manual drive in a necessary section while allowing the vehicle to travel through the automated drive control as much as possible.

The invention claimed is:

1. An automated drive assisting system comprising:
  a processor programmed to:
    acquire an expected travel route for a vehicle that includes an automated drive section in which automated drive control for the vehicle is permitted;
    execute the automated drive control for the vehicle such that the vehicle travels along the expected travel route in the automated drive section which is included in the expected travel route; and
    recover the automated drive control after the vehicle, which travels through manual drive based on a drive operation by a user, passes through a branch point that is provided in the automated drive section and that meets a predetermined condition; and
    make a changeover from the automated drive control to the manual drive at a location before the branch point in the case where the branch point is located ahead in a travel direction of the vehicle which travels through the automated drive control in the automated drive section; wherein: the branch point that meets the predetermined condition is a branch point that requires a change in vehicle orientation of a predetermined angle or more in the case where the vehicle travels along the expected travel route.

2. The automated drive assisting system according to claim 1, wherein the processor is programmed to:
  recover the automated drive control after an orientation of the vehicle is detected to have become parallel to a partition line of a road that the vehicle has entered after exiting from the branch point.

3. The automated drive assisting system according to claim 1, wherein the processor is programmed to:
  recover the automated drive control in the case where the vehicle passes through the branch point and the vehicle is detected to have entered a lane designated for a travel direction of the vehicle after passing through the branch point along the expected travel route.

4. The automated drive assisting system according to claim 3, wherein the processor is programmed to:
  provide guidance that prompts a lane change in the case where the vehicle passes through the branch point and the vehicle is detected to have entered a lane that is different from the lane designated for the travel direction of the vehicle after passing through the branch point along the expected travel route.

5. The automated drive assisting system according to claim 1, wherein the processor is programmed to:
cause the vehicle to change to a lane designated for a travel direction for passing through a next branch point along the expected travel route after the automated drive control is recovered.

6. The automated drive assisting system according to claim 1, wherein the processor is programmed to:
recover the automated drive control in the case where the user is detected to have made a predetermined indication of intention to start the automated drive control after the vehicle passes through the branch point.

7. The automated drive assisting system according to claim 6, wherein:
the predetermined indication of intention is an operation of an operation section to be operated by the user to start the automated drive control.

8. The automated drive assisting system according to claim 6, wherein:
the predetermined indication of intention is non-execution of an operation of a steering unit, a brake unit, or an accelerator of the vehicle for a certain time or more.

9. The automated drive assisting system according to claim 1, wherein the processor is programmed to:
not recover the automated drive control and continue the manual drive in the case where a next branch point along the expected travel route is located within a predetermined distance from the branch point and meets the predetermined condition.

10. The automated drive assisting system according to claim 1, wherein:
the branch point that meets the predetermined condition is such a branch point that an entry road for entry into the branch point and an exit road for exit from the branch point in the case where the vehicle travels along the expected travel route are not on an along-the-way relationship.

11. An automated drive assisting method comprising:
acquiring an expected travel route for a vehicle that includes an automated drive section in which automated drive control for the vehicle is permitted;
executing the automated drive control for the vehicle such that the vehicle travels along the expected travel route in the automated drive section which is included in the expected travel route;
making a changeover from the automated drive control to manual drive based on a drive operation by a user in the case where the vehicle passes through a branch point that meets a predetermined condition;
recovering the automated drive control after the vehicle traveling through the manual drive passes through the branch point; and
making a changeover from the automated drive control to the manual drive at a location before the branch point in the case where the branch point is located ahead in a travel direction of the vehicle which travels through the automated drive control in the automated drive section; wherein: the branch point that meets the predetermined condition is a branch point that requires a change in vehicle orientation of a predetermined angle or more in the case where the vehicle travels along the expected travel route.

12. A computer-readable storage medium storing a computer-executable automated drive assisting program that causes a computer to perform the following functions:
acquiring an expected travel route for a vehicle that includes an automated drive section in which automated drive control for the vehicle is permitted;
executing the automated drive control for the vehicle such that the vehicle travels along the expected travel route in the automated drive section which is included in the expected travel route;
making a changeover from the automated drive control to manual drive based on a drive operation by a user in the case where the vehicle passes through a branch point that meets a predetermined condition; and
recovering the automated drive control after the vehicle traveling through the manual drive passes through the branch point; and
making a changeover from the automated drive control to the manual drive at a location before the branch point in the case where the branch point is located ahead in a travel direction of the vehicle which travels through the automated drive control in the automated drive section; wherein: the branch point that meets the predetermined condition is a branch point that requires a change in vehicle orientation of a predetermined angle or more in the case where the vehicle travels along the expected travel route.

* * * * *